(12) United States Patent
Kapser et al.

(10) Patent No.: US 7,343,801 B2
(45) Date of Patent: Mar. 18, 2008

(54) MICROMECHANICAL CAPACITIVE ACCELERATION SENSOR

(75) Inventors: Konrad Kapser, Munich (DE); Peter Knittl, Kelheim (DE); Ulrich Prechtel, Munich (DE); Helmut Seidel, Starnberg (DE); Sebastian Toelg, Walluf (DE); Manfred Weinacht, Dettingen/Teck (DE)

(73) Assignee: Conti Temic microelectronic GmbH, Nuernberg (DE)

( * ) Notice: Subject to any disclaimer, the term of this patent is extended or adjusted under 35 U.S.C. 154(b) by 57 days.

(21) Appl. No.: 10/471,296

(22) PCT Filed: Mar. 7, 2002

(86) PCT No.: PCT/EP02/02502

§ 371 (c)(1),
(2), (4) Date: May 21, 2005

(65) Prior Publication Data

US 2006/0156818 A1   Jul. 20, 2006

(30) Foreign Application Priority Data

Mar. 8, 2001 (DE) ............................. 101 11 149.5
Apr. 9, 2001 (DE) ............................. 101 17 630.9

(51) Int. Cl.
*G01P 15/125* (2006.01)
(52) U.S. Cl. .................................................. 73/514.32
(58) Field of Classification Search ............. 73/514.32, 73/514.29, 514.16, 514.36, 514.38, 504.12
See application file for complete search history.

(56) References Cited

U.S. PATENT DOCUMENTS 4,598,585 A   7/1986   Boxenhorn 5,259,247 A   11/1993   Bantien
5,313,835 A   5/1994   Dunn
5,349,858 A * 9/1994   Yagi et al. ............... 73/514.02

(Continued)

FOREIGN PATENT DOCUMENTS

DE   3509948   9/1985

(Continued)

OTHER PUBLICATIONS

R. Puers et al. "Electrostatic Forces and Their Effects on Capacitive Mechanical Sensors", Sensors and Actuators, A56 (1996), pp. 203 to 210.

*Primary Examiner*—Helen Kwok
(74) *Attorney, Agent, or Firm*—W. F. Fasse; W. G. Fasse

(57) ABSTRACT

A micromechanical capacitive acceleration sensor is described for picking up the acceleration of an object in at least one direction. The sensor includes a frame structure (110), a sensor inertia mass (101) made of a wafer and movably mounted relative to the frame structure (110) about a rotation axis, and a capacitive pick-up unit (120) for producing at least one capacitive output signal representing the position of the sensor mass (101) relative to the frame structure (110). The sensor inertia mass (101) has a center of gravity which offset relative to the rotation axis in a direction perpendicularly to a wafer plane for measuring accelerations laterally to the wafer plane. The sensor mass (101) and the frame structure (110) are made monolithically of one single crystal silicon wafer. A cover section (112) forms a common connector plane (150) for the connection of capacitor electrodes (125,126). Torqueable elements (105) form an electrically conducting bearing device for the sensor mass (101).

48 Claims, 6 Drawing Sheets

U.S. PATENT DOCUMENTS

| | | |
|---|---|---|
| 5,639,973 A | 6/1997 | Okada |
| 5,707,077 A * | 1/1998 | Yokota et al. ............... 280/735 |
| 5,719,336 A * | 2/1998 | Ando et al. ............... 73/514.32 |
| 5,801,313 A * | 9/1998 | Horibata et al. ............... 73/718 |
| 5,864,063 A | 1/1999 | Otani et al. |
| 5,905,203 A * | 5/1999 | Flach et al. ............... 73/514.32 |
| 6,336,658 B1 * | 1/2002 | Itoigawa et al. ............. 280/735 |
| 6,841,992 B2 * | 1/2005 | Yue et al. .................... 324/162 |

FOREIGN PATENT DOCUMENTS

| | | |
|---|---|---|
| DE | 3837883 | 5/1989 |
| DE | 4106288 | 9/1992 |
| DE | 4126100 | 2/1993 |
| DE | 19637265 | 3/1998 |
| DE | 19709731 | 3/1998 |
| DE | 19709520 | 9/1998 |
| EP | 0244581 | 11/1987 |
| GB | 2212274 | 7/1984 |
| GB | 2186085 | 8/1987 |

* cited by examiner

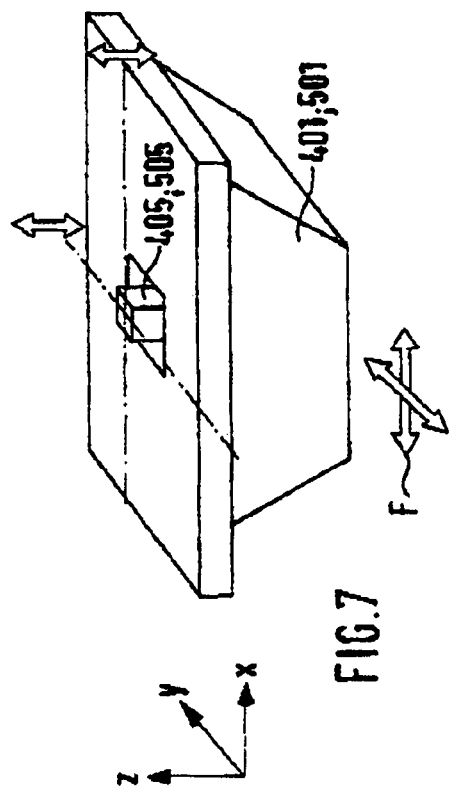
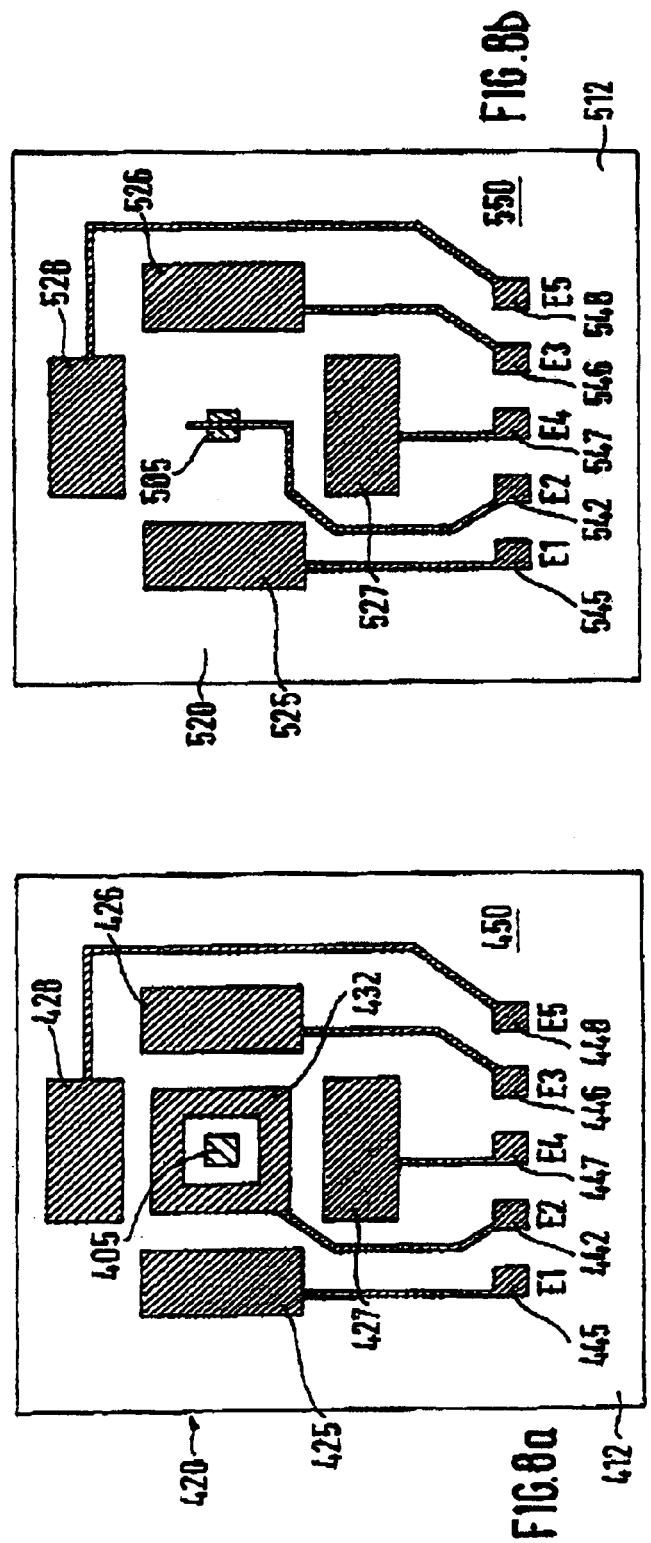

MICROMECHANICAL CAPACITIVE ACCELERATION SENSOR

FIELD OF THE INVENTION

The invention relates to a micromechanical capacitive acceleration sensor for sensing accelerations and decelerations of a moving object such as a vehicle.

BACKGROUND INFORMATION

Micromechanical capacitive acceleration sensors made of a wafer are known for picking up the acceleration of an object in one or more directions. The sensor has a mounting which is for example a frame structure which is fixed relative to the object and a sensor inertia mass which is movable relative to the mounting or frame structure of the acceleration sensor, with a bearing device by means of which the sensor mass is elastically mounted relative to the mounting about a starting position. The sensor further includes a capacitive pick-up unit for producing at least one capacitive output signal that represents the position of the sensor mass relative to the mounting or frame structure. The capacitive pick-up unit comprises for example first capacitor electrodes provided on the sensor mass and second capacitor electrodes provided on the mounting opposite the first capacitor electrodes.

For example, a coupling arrangement is provided for coupling the first capacitor electrodes provided on the sensor mass which first connector elements provided on the frame structure. The second capacitor electrodes are coupled with second connector elements.

Micromechanical capacitive acceleration sensors of this type or similar type are known from the following German patent publications: DE 38 37 883 A1; DE 196 37 265 A1; DE 41 26 100 A1, DE 197 09 520 A1 and DE 197 09 731 A1.

SUMMARY OF THE INVENTION

It is the object of the invention to provide a micromechanical capacitive acceleration sensor which is as simple as possible and thus cost effective to produce, which has a small size and a sensitivity as small as possible relative to interfering influences.

According to a first aspect of the invention a micromechanical capacitive acceleration sensor is provided for picking up the acceleration of an object in at least one direction. The sensor includes a frame structure, a sensor inertia mass made of a wafer and movably supported relative to the frame structure. The sensor further includes a capacitive pick-up unit for producing at least one capacitive output signal representing the position of the sensor mass relative to the frame structure whereby the sensor inertia mass has a center of gravity which is offset relative to the rotation axis in a direction extending perpendicularly to a plane of the wafer. This wafer plane passes through the rotation axis and the center of gravity is positioned not only outside of the rotation axis but also outside of the wafer plane in a direction perpendicularly to the wafer plane.

It is an important advantage of this acceleration sensor according to the invention that it can be manufactured in an especially simple way and that it has a large sensitivity and a compact construction. The acceleration sensor has a small sensitivity relative to interference influences. The acceleration sensor is capable of measuring accelerations parallel to the wafer surface. The present sensor is further adapted to produce two or three axes acceleration sensors or sensor systems which, for example, may be produced monolithically.

For example, either the sensor mass and/or the frame structure may be constructed monolithically out of one single crystal silicon wafer. This feature provides an especially cost effective production while providing a most compact structure and a high measuring precision.

The acceleration sensor has, for example, a bearing device for supporting the sensor inertia mass. The bearing device comprises particularly torsionable elements, for example, made of silicon. This feature also enhances the simple and cost effective production of a compact structure.

The bearing device forms preferably an electrically conducting connection between the sensor mass and an electrical contacting provided on the frame structure. This feature achieves that the contacting of the movable sensor mass takes place on the frame structure whereby the electrical connection to the sensor mass is produced in an especially simple and reliable manner.

Preferably the bearing device is arranged on the sensor mass close to the wafer surface. This features provides, for example, an especially large measuring sensitivity.

The sensor mass can, for example, be formed to have a cubic shape, or a parallelepiped shape, or a frustum shape, or a truncated pyramid shape. These geometries provide even additionally large measuring sensitivities while requiring little space and assuring a cost effective production.

A further embodiment preferably provides several sensor inertia masses which are respectively supported for movement about a rotation axis in order to measure accelerations in several directions extending perpendicularly to one another. One or more sensor masses have a respective center of gravity which is offset relative to the respective rotation axis in a direction perpendicularly to the wafer plane. Thus, a sensor system is provided which in spite of a small structural size and a cost effective production permits measurements in two or three axial directions or precise acceleration measurements in several directions of space.

Preferably the center of gravity of the sensor mass is additionally offset laterally in a direction of the wafer plane relative to the respective rotation axis. As a result of the additional lateral offset of the center of gravity a measuring sensitivity is achieved in a further direction of space.

The acceleration sensor has preferably first capacitor electrodes provided on the sensor mass and second capacitor electrodes provided on the frame structure in positions opposite the first capacitor electrodes. In this embodiment for example first connector elements for the electrical connection of the first capacitor electrodes and/or a second connector elements for the electrical connection of the second capacitor electrodes are arranged preferably in a common connector plane.

The contacting of the first connector elements and/or the second connector elements can take place from a single side. The electrical contacting of the capacitive pick-up unit can also take place from a single side.

The second capacitor electrodes and the first and second connector elements are provided in a common connector plane preferably on the frame structure.

Each of these features provides an especially advantageous possibility for contacting which simplifies the production and additionally reduces costs.

The acceleration sensor preferably has a coupling arrangement for coupling the first capacitor electrodes provided on the sensor mass with first connector elements provided on the frame structure whereby the coupling arrangement comprises for example a galvanic or capacitive connection for bridging an elevational displacement between the first capacitor electrodes and a common connector plane. Thus, for example all connector elements can be positioned in a single plane.

Preferably the frame structure comprises a central section which surrounds the sensor mass laterally and a first cover section elevationally displaced relative to the sensor mass and arranged on the central section whereby particularly second capacitor electrodes are provided on the first cover section on its side facing the sensor mass.

The side of the first cover section facing the sensor mass forms for example a common connector plane for the electrical connection of the capacitive pick-up unit.

Preferably the second capacitor electrodes are formed by a metallizing of the sensor mass or by the sensor mass itself which is at an electrical potential.

According a second aspect of the invention the acceleration sensor comprises a frame structure which is stationary relative to the object, a sensor inertia mass which is movable relative to the frame structure of the acceleration sensor, a bearing device by means of which the sensor mass is elastically supported relative to the frame structure and about a starting position. The second embodiment further includes a capacitive pick-up unit for producing at least one capacitive output signal representing the position of the sensor mass relative to the frame structure. The pick-up unit comprises first capacitor electrodes provided on the sensor mass and second capacitor electrodes provided on the frame structure in positions opposite to the first capacitor electrodes. A coupling arrangement is provided for coupling the first capacitor electrodes provided on the sensor mass with first connector elements provided on the frame structure and second connector elements to which the second capacitor electrodes are coupled. In this embodiment is it particularly provided that the first connector elements and/or the second connector elements are arranged in a common connector plane which is, for example, elevationally displaced upwardly relative to the first capacitor electrodes provided on the sensor mass and/or relative to the second capacitor electrodes provided on the frame structure. Further, the coupling arrangement comprises particularly means for bridging the elevational displacement between the first capacitor electrodes and/or the second capacitor electrodes and the common connector plane. In this second embodiment of the invention the center of gravity of the sensor inertia mass is also located outside the rotation axis and outside a wafer plane through which the rotation axis extends.

The essential advantage of this aspect of the micromechanical capacitive acceleration sensor according to the invention is seen in that it is particularly simple to produce.

This advantage is particularly due to the fact that all electrical connections in the form of the connector elements for the first and second capacitor electrodes are positioned in a single plane.

According to a preferred embodiment of the acceleration sensor according to the invention it is provided that the second capacitor electrodes provided at the frame structure and the first and second connector elements are arranged in the common connector plane and that the coupling arrangement comprises means for bridging the elevational displacement to the common connector plane. This embodiment is especially advantageous because the arrangement of the first and second connector elements together with the second capacitor electrodes in a common plane makes the production especially simple.

According to a further aspect of the invention it is provided that the coupling arrangement forms a galvanic connection that bridges the elevational displacement to the common connector plane.

According to a still other aspect of the invention it is provided that the coupling arrangement forms a capacitive connection that bridges the elevational displacement to the common connector plane.

According to an especially preferred embodiment of the invention it is provided that the frame structure comprises a central section laterally surrounding the sensor mass and a first cover section elevationally displaced relative to the sensor mass and arranged on said central section, whereby the second capacitor electrodes are provided on the side of the first cover section that faces the sensor mass and wherein the first capacitor electrodes are provided on the sensor mass opposite said second capacitor electrodes. The advantage of this arrangement is seen in the simple contacting and in small stray capacities.

An advantageous further development of the just mentioned embodiment provides that the common connector plane is formed by the side of the first cover section which faces the sensor mass and on which side said first connector elements and said second connector elements are arranged in said common connector-plane and in which side the second capacitor electrodes are also provided.

A preferred embodiment hereof provides that the first connector elements, the second connector elements, and the second capacitor electrodes which are connected with the second connector elements, are produced of a single conducting layer which is formed on the side of the first cover section facing the sensor mass.

In connection with embodiments in which the coupling arrangements comprises a capacitive connection it is advantageously provided that a second coupling electrode is formed on the side of the first cover section facing the sensor mass and that a first coupling electrode is provided on the sensor mass opposite the second coupling electrode. In this embodiment the first and the second coupling electrodes form a capacitive connection of the coupling arrangement for coupling the first capacitor electrodes provided on the sensor mass with a first connector element provided on the frame structure.

This embodiment is advantageously further developed in that the second coupling electrode together with the first connector element are provided in the common connector plane which is formed by that side of the first cover section which faces the sensor mass.

Furthermore, it is preferably provided that the second coupling electrode and the first connector element connected therewith are produced together with the second capacitor electrodes and the second connector element connected with the second capacitor electrodes, of a single conducting layer formed on that side of the first cover section which faces the sensor mass.

In those embodiments in which the frame structure comprises a central section laterally surrounding the sensor mass and a first cover section elevationally displaced relative to the central section and arranged on the central section, it is advantageously provided that a second cover section is provided on the central section opposite the first cover section and elevationally displaced relative to the sensor mass. The first cover section, the central section and the second cover section form a housing that hermetically encloses the sensor mass, the first capacitor electrodes and to the second capacitor electrodes. The housing that hermetically seals the acceleration sensor provides on the one hand reliable protection relative to environmental influences and on the other hand makes it possible to adjust inside the housing a small gas pressure for reducing the damping.

According to a type of embodiment of the acceleration sensor according to the invention it is provided that the bearing device is formed by torsion elements to which the sensor mass is mounted in a torsion elastic manner relative to the frame structure and about said starting position.

A preferred embodiment of this version provides that two torsion elements forming the bearing device are positioned on a common rotation axis and wherein the two torsion elements are effective on two opposite sides of the sensor mass whereby the sensor mass is movable only in a single direction relative to the frame structure.

A preferred embodiment of the acceleration sensor according the invention provides that the torsion elements are secured on the one hand to the sensor mass and on the other hand to the central section of the frame structure.

According to an aspect of the invention it is provided that the coupling arrangement is formed by a galvanic connection which comprises the torsion elements.

Another type of the embodiment of the acceleration sensor according to the invention provides that the bearing device is formed by one or more bending elements on which the sensor mass is supported in a bending elastic manner about said starting position and relative to the frame structure.

A preferred embodiment hereof provides that two bending elements are positioned in a common plane, spaced from each other and connected to the sensor mass whereby the sensor mass is movable only in a single direction relative to the frame structure.

According to an embodiment it is provided that the bending elements are connected on the one hand to the sensor mass and on the other hand to the first cover section of the frame structure.

Another aspect of the invention provides that the coupling arrangement is formed by a galvanic connection that includes the bending elements.

Another type of embodiment of the acceleration sensor according to the invention provides that a single bending element is centrally secured to the sensor mass whereby the sensor mass is movable relative to two different directions and relative to the frame structure. This embodiment further includes the pick-up unit for producing two capacitive output signals which are representing the position of the sensor mass relative to the frame structure. The advantage of this type of embodiment is seen in that with a single sensor mass it is possible to pick up accelerations in two different directions for example in the two directions of the horizontal plane.

According to a preferred embodiment hereof it is provided that the pick-up unit comprises four first capacitor electrodes which are secured to the sensor mass in pairs positioned opposite each other and on opposite sides of the bending element. Four second capacitor electrodes are secured to the first cover section of the frame structure whereby the second capacitor electrodes are arranged in pairs positioned opposite each other on opposite sides of the bending element and opposite the first capacitor electrodes.

In case a capacitive connection is to be formed in the last mentioned embodiment by the coupling arrangement, it is particularly advantageous to provide that the coupling arrangement comprises a first coupling electrode secured to the sensor mass and surrounding the bending element and a second coupling electrode secured to the first cover section of the frame structure said second coupling electrode being positioned opposite the first coupling electrode and surrounding the bending element.

In connection with the embodiments in which the coupling arrangement forms a galvanic connection it is advantageous to provide that the coupling arrangement is formed by a galvanic connection which comprises the bending element.

According to a further type of embodiment of the acceleration sensor according to the invention it is provided that for picking up the acceleration of an object in several directions, several sensor masses are provided each equipped with a capacitive pick-up unit. These several sensor masses are mounted independently of one another each by means of a corresponding bearing device in a frame structure. Each sensor mass is provided with a capacitive pick-up unit for producing an output signal representing the position of the corresponding sensor mass relative to the frame structure.

Hereby, it is advantageously provided that the sensor masses are mounted in a common plane in the frame structure and that the first and second connector elements of all sensor masses are provided in a common connector plane.

According to an embodiment of the acceleration sensor according to the invention it is provided that a sensor mass is provided for picking up the acceleration of the object in a horizontal direction, wherein the sensor mass comprises a bearing device which is elevationally displaced upwardly relative to the mass center of gravity whereby the sensor mass performs, in response to an acceleration of the object, a rotational motion about a rotation axis defined by the bearing device.

According to another embodiment of the acceleration sensor according to the invention it is provided that a sensor mass for picking up the acceleration of the object in a vertical direction is provided which comprises a bearing device laterally offset relative to the mass center of gravity whereby the sensor mass performs, in response to an acceleration of the object, a rotational motion about a rotation axis defined by the bearing device.

In this connection it is particularly advantageous to provide that the first capacitor electrodes are respectively provided in pairs on the sensor mass on opposite sides of the rotational axis defined by the bearing device and in that the second capacitor electrodes are provided on the frame structure also in pairs and respectively positioned opposite the first capacitor electrodes, and that the differential capacity of the capacitor electrodes forming pairs is used for producing the capacitive output signal of the pick-up unit. Picking up the difference capacity for producing the output signal is particularly advantageous for minimizing interfering influences.

Advantageously it is provided that the first capacitor electrodes provided on the sensor mass are formed by a conducting material of which the sensor mass is made.

In the embodiments in which the frame structure comprises a center section laterally surrounding the sensor mass and a first cover section secured thereto, it is advantageous if the first cover section of the frame structure is made of a glass containing an alkali metal.

It is also advantageous to provide that the second cover section of the frame structure is made of a glass containing an alkali metal.

Further, there is provided a method for producing an acceleration sensor in accordance with one of the preceding embodiments whereby each of the sensor masses is first produced as a single sensor with its own and wherein the single sensors are then assembled to a complete sensor.

BRIEF DESCRIPTION OF THE DRAWINGS

In the following example embodiments of the invention are described with reference to the drawing wherein:

FIG. 1b shows an electrical equivalent circuit diagram of the capacitive acceleration sensor according to FIG. 1a;

FIG. 2 is a cross sectional view of a micromechanical capacitive acceleration sensor according to the first example embodiment shown in FIG. 1a;

FIG. 5 shows a cross sectional view of the micromechanical capacitive acceleration sensor according to the example embodiment of FIG. 4a;

FIG. 7 is a perspective view of a sensor mass of a micromechanical capacitive acceleration sensor for picking up the acceleration of an object in two directions (x, y) according to a fourth and according to a fifth example embodiment of the invention; and FIGS. 8a and 8b respectively show plan views of arrangements of capacitor and connector elements of a micromechanical capacitive acceleration sensor for picking up the acceleration of an object in two directions (x, y) according to the fourth and fifth example embodiment of the invention.

DETAILED DESCRIPTION OF A PREFERRED EXAMPLE EMBODIMENT AND OF THE BEST MODE OF THE INVENTION

Figure 1B:
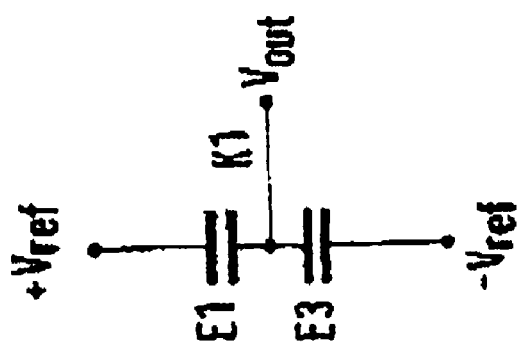
Figure 1A:
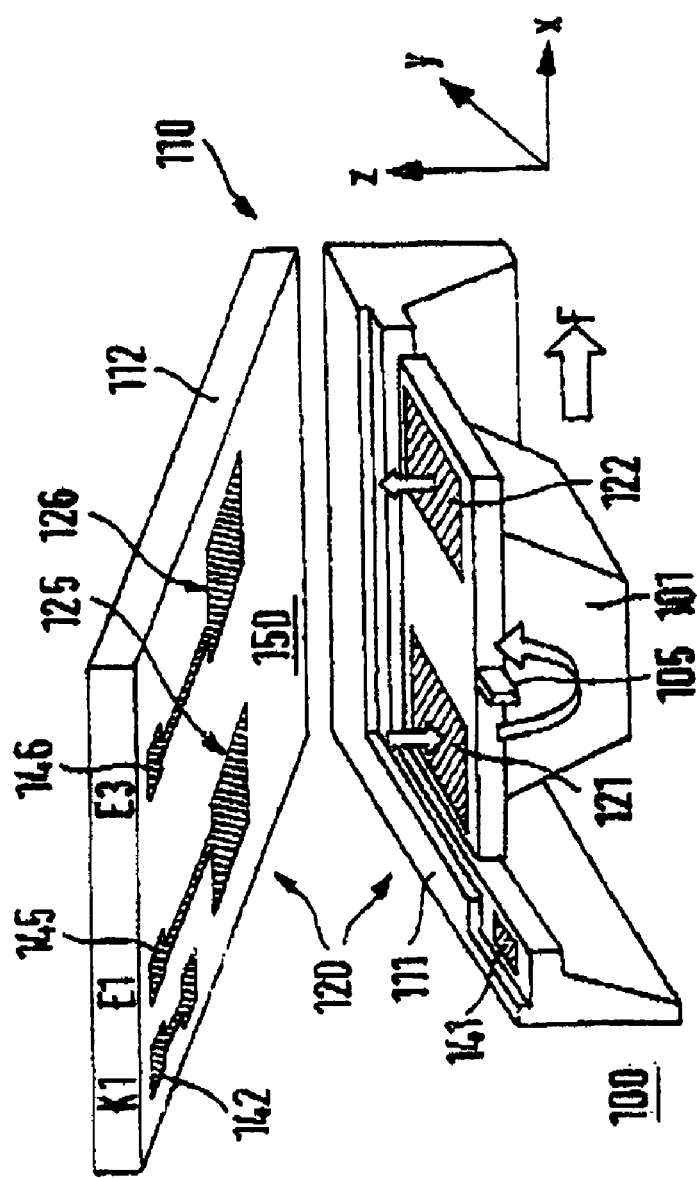
FIG. 1a shows a perspective partially sectional view of a micromechanical capacitive acceleration sensor for picking up the acceleration of an object in one direction according to a first example embodiment of the invention.
Figure 2:
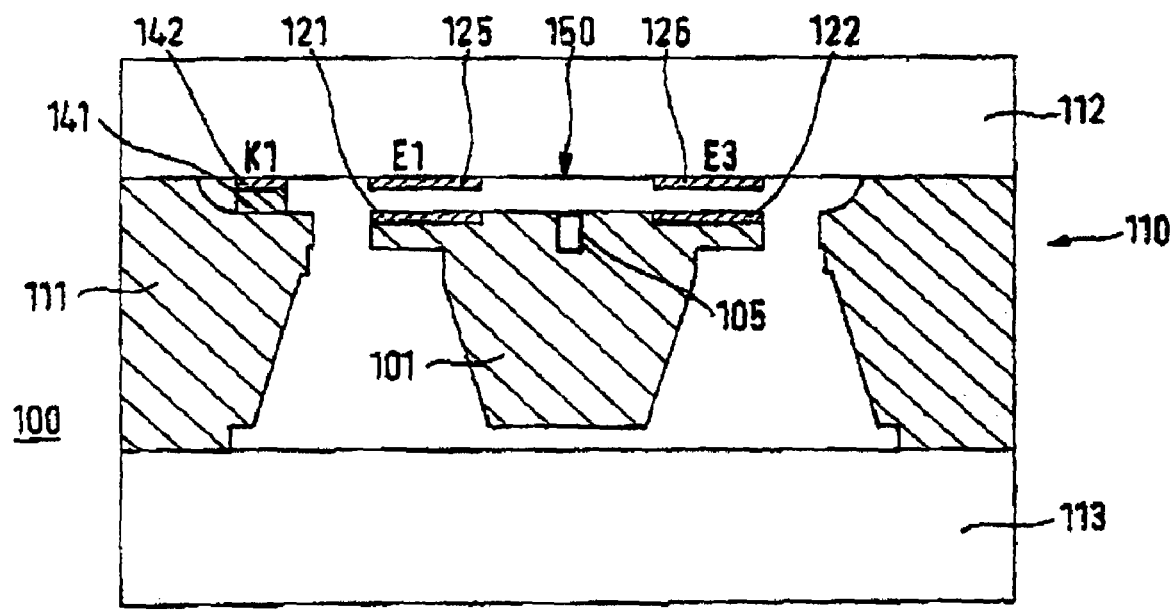

In FIGS. 1a and 2 a first example embodiment of the micromechanical capacitive acceleration sensor for picking up the acceleration of an object in one direction namely the direction x is altogether designated with the reference character 100. The acceleration sensor 100 comprises a frame structure 110 including a central section 111, a first cover section 112 and a second cover section 113 whereby the latter is shown only in FIG. 2. The frame structure 110 is arranged in a fixed position relative to the object the acceleration of which is to be picked up. The acceleration sensor 100 comprises a sensor inertia mass 101 which is movable relative to the frame structure 110 of the acceleration sensor 100 and which is elastically mounted about a starting position by a bearing device 105 relative to the frame structure 110. As shown, for example in present FIGS. 1a, 2, 4a, 5, 6 and 7 the sensor inertia mass of the invention has two sections. The first section is a flat top section which defines a wafer plane in which the rotation axis of the sensor inertia mass extends. The second section of the present inertia mass is connected to the first section and has a configuration that determines the position of the center of gravity of the sensor inertia mass. According to the invention this position of the center of gravity of the sensor inertia mass is located outside the rotation axis and outside of the flat top section of the sensor inertia mass namely outside the wafer plane in a direction perpendicularly away from the wafer plane.

The sensor inertia mass 101 has, in the preferred example embodiment shown here, a center of gravity which is arranged offset relative to the rotation axis of the sensor mass 101 in a direction extending perpendicularly to the wafer plane.

That is, in this example embodiment the center of gravity of the sensor mass 101 is supported outside of the rotation axis, whereby the rotation axis is positioned near to the surface of the wafer or of the sensor mass 101, and the center of gravity is positioned below the rotation axis when the wafer surface is horizontally aligned. Thus, an acceleration F oriented in parallel to the wafer surface can be measured. The acceleration F causes a deflection of the sensor inertia mass 101 about the rotation axis.

The central section 111 of the frame structure 110 laterally surrounds the sensor mass 101 and the first cover section 112 is elevationally offset relative to the sensor mass 101 and arranged on the central section 111.

The bearing device 105 in the example embodiment as shown in FIGS. 1a and 2 is formed by torsion elements to which the sensor mass 101 is mounted in a torque elastic manner relative to the frame structure 110 i.e. relative to the central portion 111 for movement about said starting position. The torsion elements that form the bearing device 105 are provided on sides of the sensor mass 110 positioned opposite each other on a common rotation axis. Thus, the sensor mass 101 is only movable relative to a single direction, namely the coordinate direction designated by x in FIG. 1a relative to the frame structure 110. The sensor mass 101 moves in the direction of the x-axis about its rotation axis in response to the occurrence of an acceleration force Fx whereby the deflection at the edge of the sensor mass 101 is directed upwardly and downwardly. The torsion elements 105 are connected on the one hand to the central section 111 of the frame structure 110 and on the other hand to the sensor mass 101 in a rotationally stable manner.

Furthermore the acceleration sensor 100 comprises a capacitive pick-up unit 120 for producing a capacitive output signal which represents the position of the sensor mass 101 relative to the frame structure 110. The pick-up unit comprises first capacitor electrodes 121, 122 provided on the sensor mass 101 and second capacitor electrodes 125, 126 provided at the frame structure 110 opposite the first capacitor electrodes 121, 122. The first capacitor electrodes 121, 122 provided on the sensor mass 101 are connected to a first connector element 142 provided on the first cover section 112. The connection is a galvanic connection formed by a coupling arrangement which is formed by the torsion elements 105. The galvanic connection also passes through a metallization 141 on the central section 111 of the frame structure 110. Second connector elements 145, 146 are coupled with the second capacitor electrodes. The second connector elements are also provided on the first cover section 112 of the frame structure 110.

The first capacitor electrodes 121, 122 provided on the sensor mass 101 are formed by a conducting material of which is the sensor mass 101 is made. In this manner one obtains an equivalent electrical circuit diagram for the first and second capacitor electrodes 121, 122 and 125, 126 as shown in FIG. 1b. Two capacities E1 and E3 are connected in series between two reference voltages +Vref (connector element 145) and −Vref (connector element 146). The center junction of the capacitor series connection is connected to a terminal K1 (connector element 142) at which the output signal Vout can be tapped off.

The first connector element 142 and the second connector elements 145, 146 are arranged in a common connector plane 150. In this first example embodiment this common connector plane 150 is offset relative to the first capacitor electrodes 121, 122 provided on the sensor mass 101. This elevational offset is bridged by the coupling arrangement formed by the torsion elements 105, the metallization 141 and the first connector element 142. The second capacitor electrodes 125,126 are also arranged in said common connector plane 150 together with the first and second connector elements 142 and 145, 146. The connector plane 150 is formed by one side of the first cover section 112. The first connector element 142, the second connector elements 145, 146 and the second capacitor electrodes 125, 126, which are connected with the latter, are made of a single conductive layer formed on that side of the first cover section 112 which faces the sensor mass 101.

As seen in FIG. 2, the central section 111, the first cover section 112 and the second cover section 113 form together a hermetically sealed housing in which the sensor mass 101 is arranged together with the first capacitor electrodes 121, 122 and the second capacitor electrodes 125, 126. The first cover section 112 and the second cover section 113 of the frame structure 110 are made of a glass containing an alkaline metal.

Figure 3:
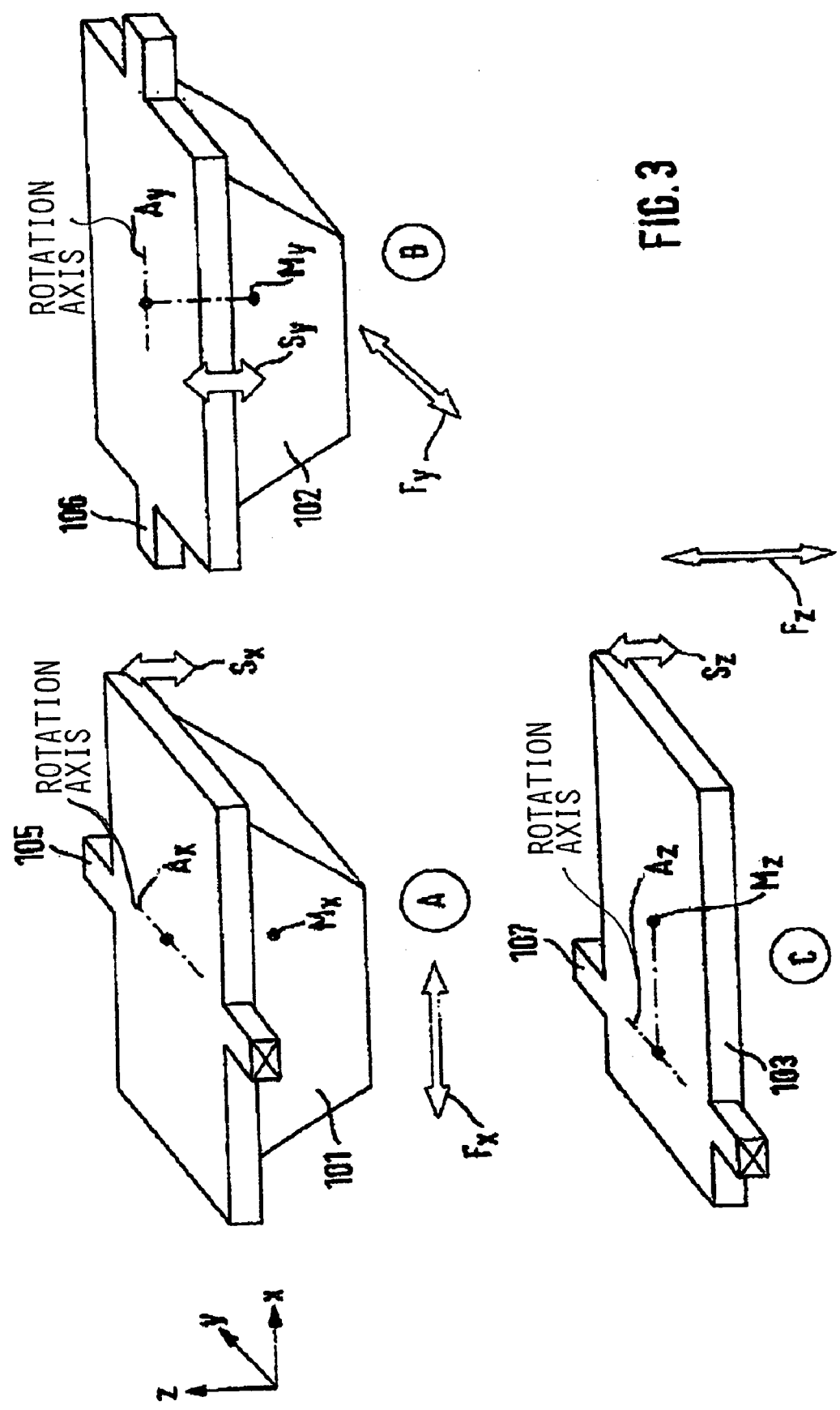
FIG. 3 shows the perspective views of three sensor masses of a micromechanical capacitive acceleration sensor for picking up the acceleration of an object in three directions (x, y, z) as an expansion of the first example embodiment of the invention shown in FIG. 1.

FIG. 3 shows the sensor masses 101, 102, 103 which are provided for picking up the acceleration of an object in several directions namely the directions x, y, z of the coordinate system shown in FIG. 3. The sensor mass 101 (partial FIG. A) corresponds to the sensor mass 101 of the acceleration sensor shown in FIGS. 1a and 2. The sensor mass 101 is mounted in a torsion elastic manner by means of torsion elements 105 whereby it is movable about a starting position. The torsion element 105 defines a rotation axis which is offset relative to the mass center of gravity Mx of the sensor mass 101 so that an acceleration force Fx effective in the x-direction causes a deflection Sx. The sensor mass 102 (partial FIG. B) corresponds in its configuration substantially to the sensor mass 101 and also has torsion elements 106 which form a bearing device for supporting the sensor mass in a torsion or rotational elastic manner. However, the rotation axis defined by the torsion elements 106 is angularly displaced by 90 degrees in the horizontal plane relative to the rotation axis of the sensor mass 101. The rotation axis formed by the torsion elements 106 is again displaced relative to the mass center of gravity My of the sensor mass 102 in elevation so that an acceleration force Fy effective in the y-direction causes a deflection Sy of the sensor mass about its starting position. The sensor masses 101 and 102 are provided, corresponding to the sensor mass 101 of FIGS. 1a and 2 with first capacitor electrodes 121 and 122 of a capacitive pick-up unit not particularly shown in FIG. 3. The capacitive pick-up unit produces a capacitive output signal representing the position of the sensor mass 102 relative to a frame structure also not shown in particular in FIG. 3.

A third sensor mass 103 (partial FIG. C of FIG. 3) is mounted by means of a bearing device formed by torsion elements 107 for rotation about a rotation axis. The mass center of gravity Mz is laterally offset relative to the rotation axis formed by the torsion elements 107. A vertical acceleration Fz caused by an acceleration in the vertical z-direction causes a deflection Sz of the end of the sensor mass 103 as shown in partial FIG. C.

Each of the sensor masses 101, 102, 103 is provided with a capacitive pick-up unit for producing a respective output signal representing the corresponding position of the sensor mass relative to a frame structure not shown. This capacitive pick-up unit comprises respectively first capacitor electrodes (not shown in FIG. 3). These first capacitive electrodes are provided in pairs respectively on opposite sides of the rotation axis Ax, Ay, Az. These rotation axis are defined by the torsion elements 105, 106 and 107 respectively. Second capacitor electrodes of the capacitive pick-up unit are provided on the frame structure, not shown, of the acceleration sensor. The second capacitor electrodes are positioned opposite the first capacitor electrodes. For the sensor masses 101 and 102 shown in the partial FIGS. A & B, this means an arrangement similar to that shown in FIGS. 1a and 2. In connection with the sensor mass 103 shown in partial FIG. C of FIG. 3, the first capacitor electrode is arranged to the left of the rotation axis defined by the torsion elements 107 on the short piece of the sensor mass 103. The other capacitor electrode is arranged symmetrically to the first capacitor electrode and to the right hand side of the rotation axis defined by the torsion elements 107. Here again the difference capacity of the capacitor electrodes arranged in pairs is used for producing the capacitive output signal of the capacitive pick-up units. This utilization of the difference capacity is similar to that explained with reference to the example embodiment of FIGS. 1 & 2. The first capacitor electrodes provided on the sensor mass 101, 102 or 103 are formed in the just described example embodiment by a conducting material of which the sensor mass 101, 102, 103 is made.

Each of the sensor masses 101, 102 and 103 shown in FIG. 3 is initially and preferably produced as an individual sensor with its own frame structure. These individual sensors are then assembled to form a complete sensor capable of picking up accelerations in all three directions of space x, y, z.

Figure 4B:
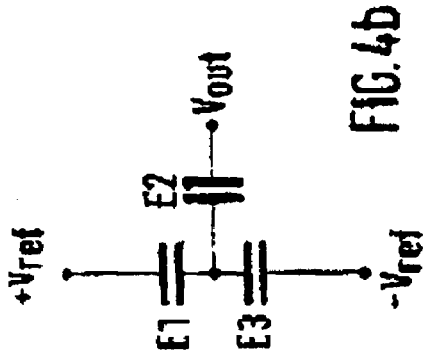
FIG. 4b shows an electrical equivalent circuit diagram of the capacitive acceleration sensor of FIG. 4 according to a variant with a capacitive coupling.
Figure 4C:
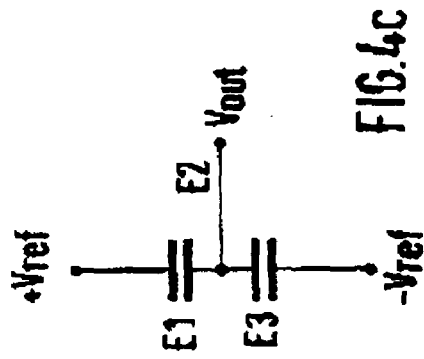
FIG. 4c is an electrical equivalent circuit diagram of the capacitive acceleration sensor of FIG. 4a according to a variant with a galvanic coupling.
Figure 4A:
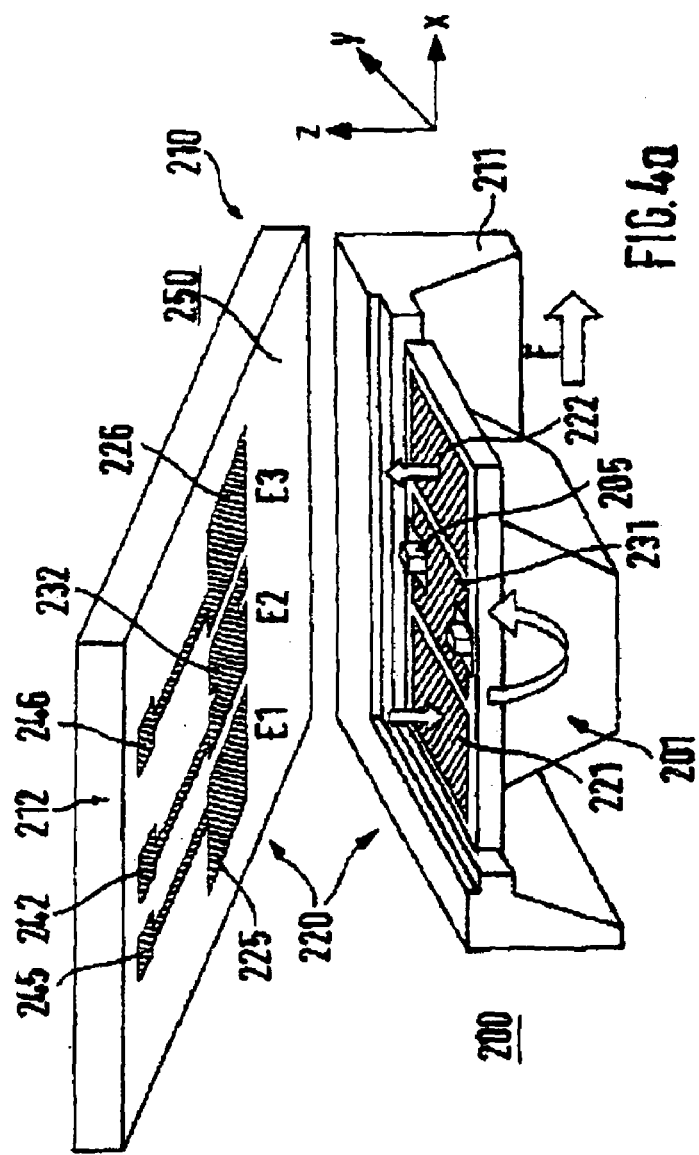
FIG. 4a is a perspective view partially in section of a micromechanical capacitive acceleration sensor for picking up the acceleration of an object in one direction (x) according to a second example embodiment of the invention.
Figure 5:
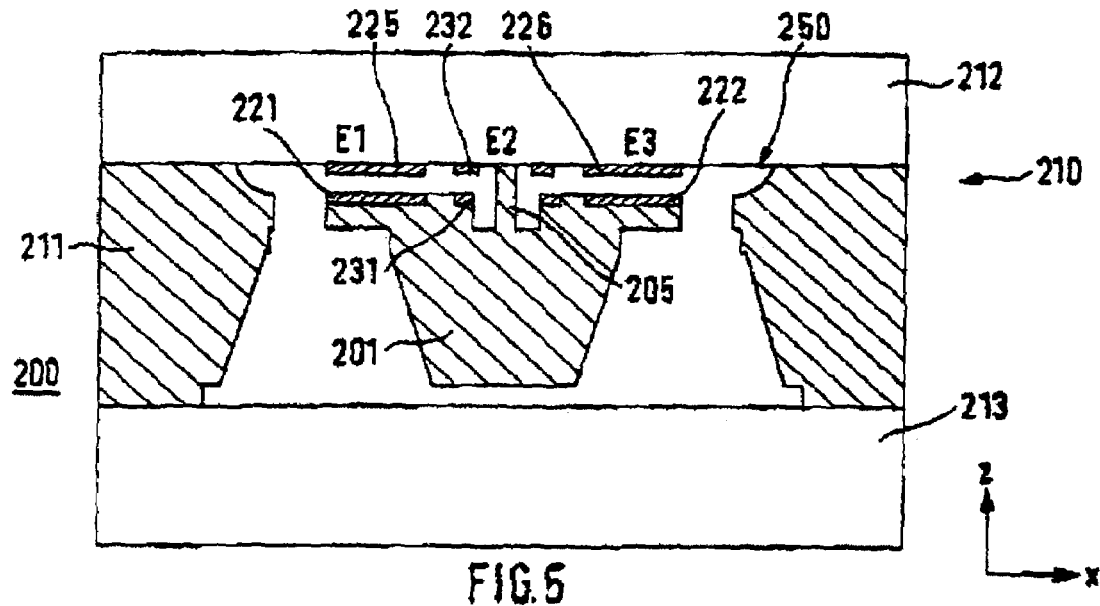
Figure 6:
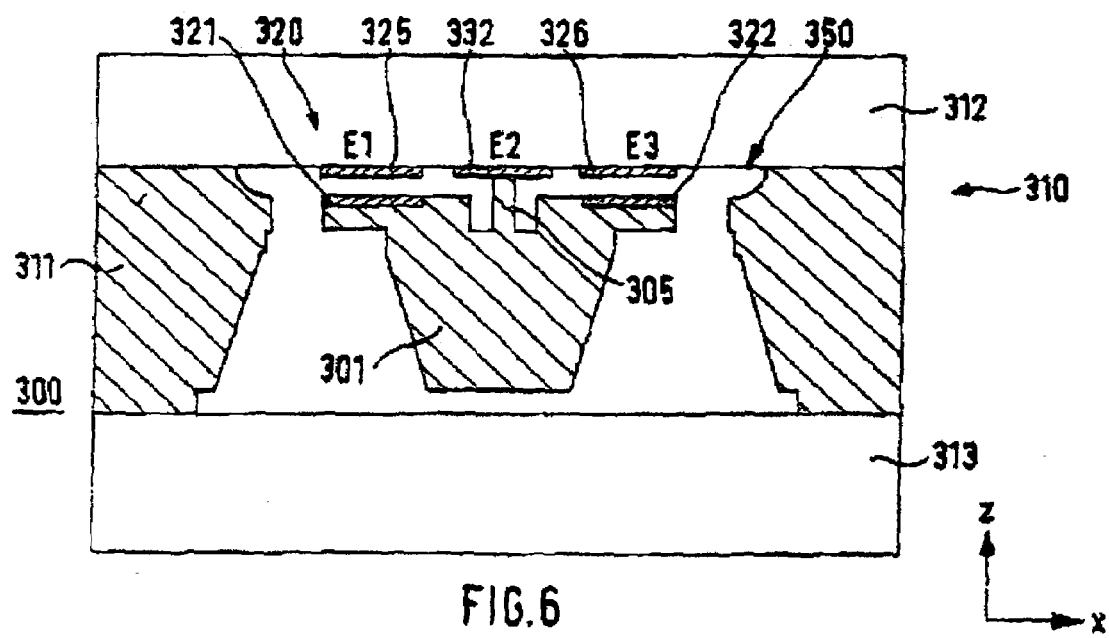
FIG. 6 shows a sectional view of a micromechanical capacitive acceleration sensor according to a third example embodiment of the invention.

The acceleration sensor shown in FIGS. 4a, 5 and 6 according to a second and a third example embodiment of the invention is designated altogether with the reference characters 200; 300. The acceleration sensor 200; 300 serves for picking up the acceleration of an object in the x-direction shown in the coordinate system illustrated in FIG. 4a. The sensor comprises a frame structure 210, 310 which is mounted in a fixed position relative to the object the acceleration of which is to be picked up. The acceleration sensor further comprises a sensor inertia mass 201, 301 which is movable relative to the frame structure 210, 310 of the acceleration sensor 200, 300. The sensor mass 201, 301 is elastically mounted about a starting position by means of a bearing device 205, 305 relative to the frame structure 210, 310.

The frame structure 210, 310 comprises a center section 211, 311 laterally surrounding the sensor mass 201, 301 and a first cover section 212, 312 arranged on the center section 211, 311 elevationally displaced relative to the sensor mass 201, 301. The bearing device of the second and third example embodiments shown in FIGS. 4 to 6 is formed by bending elements 205, 305. The sensor mass 201, 301 is mounted to the bending elements in a bending elastic manner about the starting position and relative to the frame structure 210, 310. As shown in FIG. 4a, two of these bending elements which are provided in a common plane and spaced from one another and connected to the sensor mass 201, 301. These bending elements 205, 305 define a rotation axis about which the sensor mass 201, 301 moves in response to the occurrence of an acceleration force Fx in the direction of the x-axis whereby the deflection Sx at an edge of the sensor mass 201, 301 is directed upwardly and downwardly. The bending elements 205, 305 are connected on the one hand to the sensor mass 201, 301 and on the other hand to the first cover section 212, 312 of the frame structure 210, 310.

The acceleration sensor 200, 300 comprises a capacitive pick-up unit altogether designated by the reference character 220, 320. This pick-up unit 220, 320 serves for producing an output signal representing the position of the sensor mass 201, 301 relative to the frame structure 210, 310 and thus the size of the acceleration force Fx that deflects the sensor mass 201, 301 out of its starting position. This output signal is a measure for the acceleration of the object to which the acceleration sensor is attached. The capacitive pick-up unit 220, 320 comprises first capacitor electrodes 221, 222, 321, 322 which are provided on the sensor mass 201, 301. The pick-up unit further comprises second capacitor electrodes 225, 226; 325, 326 which are secured to the frame structure 210, 310 more specifically on the first cover section 212, 312 in positions opposite the first capacitor electrodes 221, 222; 321, 322.

Generally, a coupling arrangement is provided for coupling the first capacitor electrodes 221, 222 or 321, 322 provided on the sensor mass 201, 301 with first connector elements. Of these connector elements, the first connector element 242 of the acceleration sensor 200 is seen in FIG. 4a according to the second example embodiment. This first connector element 242 is arranged on the frame structure 210, more specifically on the first cover section 212 thereof. The acceleration sensor 300 shown in FIG. 6 according to the third example embodiment, is arranged correspondingly, however, the connector element corresponding to the first connector element 242 of FIG. 4a is not visible in FIG. 6.

The second capacitor electrodes 225, 226 or 325, 326 provided on the first cover section 212, 312 are coupled with the second connector elements. Here again the second connector elements 245, 246 which are connected with the second capacitor electrodes 225, 226 of the acceleration sensor 200, are seen in FIG. 4a. The acceleration sensors 300 of the third example embodiment shown in FIG. 6 has a corresponding arrangement.

The first connector elements, compare the connector element 242 in FIG. 4a, and the second connector elements, compare the connector elements 245, 246 in FIG. 4a, are arranged in a common connector plane 250, 350. This common connector plane is formed by that side of the first cover section 212, 312 which faces the sensor mass 201, 301. Further, this common connector plane is elevationally offset relative to the first capacitor electrodes 221, 222; 321, 322 provided on the sensor mass 201, 301. The coupling arrangement which connects the first capacitor electrodes 221, 222 or 321, 322 provided on the sensor mass 201 or 301, with the first connector elements, compare 242 in FIG. 4a, forms a bridging of the elevational offset between the sensor mass 201, 301 and said common connector plane 250, 350.

The coupling arrangement in the acceleration sensor 200 of the second example embodiment shown in FIGS. 4a and 5 is formed by a capacitive connection. This capacitive connection comprises first and second coupling electrodes 231 and 232 positioned opposite each other. The first coupling electrode 231 is provided on the sensor mass 201. The second coupling electrode is provided on the first cover section 212. The second coupling element 232 is connected with the above mentioned first connector element 242. The second coupling electrode is provided on that side of the first cover 212 which faces the sensor mass 201, compare FIG. 4a.

FIG. 4b shows an electrical equivalent circuit diagram of the acceleration sensor 200 according to the second example embodiment as shown in FIGS. 4a and 5. As can be seen the capacities E1 and E3 formed by the first capacitor electrodes 221, 222 and by the second capacitor electrodes 225, 226, are connected in series between a positive reference voltage +Vref (at the terminal 245) and a negative reference voltage −Vref (at the terminal 246). The output signal Vout is provided at the center junction through a capacity E2 formed by the capacitive coupling.

Contrary to the above, in the third example embodiment of the acceleration sensor 300 shown in FIG. 6, the first capacitor electrodes 321, 322 are galvanically connected with the first connector element corresponding to the connector element 242 in FIG. 4a. Specifically, the connection extends through the bending elements 305 which are made of a conductive material. In this manner a galvanic connection is formed between the capacities E1 and E3 formed by the capacitor electrodes 321, 322 and 325, 326. The output voltage Vout can be tapped off at this galvanic connection, compare FIG. 4c.

As in the first example embodiment of the acceleration sensor shown in FIG. 1a and FIG. 2, the first cover section 212, 312 and the second cover section 213, 313 in the acceleration sensors 200 and 300 according to the second and third example embodiment of FIGS. 4a, 5 and 6 are also made of a glass containing an alkali metal. The first cover section 212, 312, the central section 211, 311 and the second cover section 213, 313 form together a hermetically sealed housing for the sensor mass 201, 301, for the first capacitor electrodes 221, 222; 321, 322 and for the second capacitor electrodes 225, 226; 325, 326. The second cover section 213, 313 is connected to the center section 211, 311 of the frame structure 210, 310 and positioned opposite the first cover section 212, 312.

The first connector elements, shown at 242 in FIG. 4a, the second connector elements shown at 245, 246 in FIG. 4a and the second capacitor electrodes 225, 226 or 325, 326 are formed of a single conducting layer in the example embodiments shown in FIGS. 4a, 5 and 6. This single conducting layer is formed on that side of the first cover section 212, 312 that faces the sensor mass 201, 301.

FIG. 7 shows a sensor mass 401, 501 of fourth and fifth example embodiments of the acceleration sensor capable of picking up acceleration in two directions namely the x-direction and the y-direction in the horizontal plane. A single bending element 405, 505 is secured centrally to the sensor mass 401, 501 so that the sensor mass is movable in two different directions in response to acceleration forces Fx or Fy relative to a frame structure not shown in FIG. 7.

In order to obtain output signals representing the position of the sensor mass 401, 501, capacitive pick-up units are provided which will be described with reference to FIGS. 8a and b.

FIG. 8 shows a portion of capacitive pick-up units 420, 520 for picking up the position of the sensor mass 401, 501 in two directions. The pick-up unit comprises four second capacitor electrodes 425, 426, 427, 428; 525, 526, 527 and 528 which are provided in pairs facing each other on opposite sides of the bending element 405, 505 on a first cover section 412, 512 of a frame structure similar to the example embodiments illustrated in FIG. 1a and FIG. 2 or in FIGS. 4a to 6. These second capacitor electrodes 425, 426, 427, 428; 525, 526, 527, 528 are electrically connected with second connector elements 445, 446, 447, 448; 545, 546, 547 and 548. Similar first capacitor electrodes are provided on the sensor mass 401, 501 and positioned opposite the second capacitor electrodes 425, 426, 427, 428; 525, 526, 527 and 528. These first capacitor electrodes are not particularly shown in FIG. 7.

FIG. 8a illustrates a fourth example embodiment including a coupling arrangement which connects the first capacitor electrodes provided on the sensor mass 401 with a first connector element 442 on the first cover section 412. The fourth example embodiment further comprises a first coupling electrode surrounding the bending element 405. The first coupling electrode is not shown but provided on the sensor mass 401, and a second coupling electrode 432 surrounding the bending element 405 and positioned opposite the first coupling electrode. The second coupling electrode 432 is secured to and provided on the first cover section 412 of the frame structure. Thus, a capacitive connection is formed between the first capacitor electrodes provided on the sensor mass 401 and the first connector element 442.

Contrary to the above, in the example embodiment shown in FIG. 8b, the coupling arrangement is formed by a galvanic connection comprising the bending element 505 so that the first capacitor electrodes provided on the sensor mass 501, please compare FIG. 7, are connected galvanically through the bending element 505 with the first connector element 542.

As in the above example embodiments, the first capacitor electrodes provided on the sensor mass 401, 501 are formed by a conducting material of which the sensor mass 401, 501 is made.

The sensor mass used in particularly preferred embodiments of the invention is made of a single crystal silicon. Thereby the capacitor electrodes of the sensor mass are formed directly by the sensor mass itself. In these cases the sensor mass is electrically connected with the frame structure whereby the torsion beams or the suspensions of the sensor mass form conducting connections to the sensor mass. Thus, the sensor mass is maintained at a certain electrical potential and forms with the oppositely positioned capacitor electrodes capacitive elements for the measurement of the deflection of the sensor mass. The electrical contacting of the sensor mass takes place for example at a location of the frame which is readily accessible and which is connected in an electrically conducting manner with the sensor mass through the torsion beams.

The contacting of all electrical connections can be achieved on a single side for example on the back side of the sensor or from its top side with the wafer alignment shown in FIG. 1a. It is thereby possible to provide holes in the wafer which contain conducting material or are filled with conducting material in order to electrically contact from the outside the connector electrodes 142, 145 and 146 positioned on the inside for example on the side 150 of the cover section 112 positioned opposite the sensor mass 101.

Instead of the coupling arrangement 141, 142 shown in FIG. 1a, with one connecting electrode 142 of the sensor mass 101 at the cover section 112, it is possible to arrange the connector electrodes of the sensor mass 101 at the lower frame structure 110. Thus, the connector electrode may for example be positioned on the bottom side of the shoulder or projection of the frame structure 110, more specifically, below the coupling arrangement 141 shown in FIG. 1a.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

The invention claimed is:

1. A micromechanical capacitive acceleration sensor for picking up an acceleration of an object in at least one direction, said sensor comprising a sensor inertia mass having a center of gravity, a frame structure and a rotation axis movably supporting said sensor inertia mass in said frame structure, said sensor inertia mass comprising a first section forming a first part of a wafer defining a wafer plane in which said rotation axis extends, said sensor inertia mass comprising a second section forming a second part of said wafer and having a center of gravity determining configuration such that said center of gravity of said sensor inertia mass is positioned outside said rotation axis and outside said wafer plane in a direction perpendicularly to said wafer plane, said capacitive acceleration sensor further comprising at least one capacitive pick-up unit for producing at least one capacitive output signal representing a position of said sensor inertia mass relative to said frame structure.

2. The acceleration sensor of claim 1, wherein any one of said sensor inertia mass and said frame structure is made monolithically of a single crystal silicon member.

3. The acceleration sensor of claim 1, further comprising a bearing device including torqueable elements made of silicon for supporting said sensor inertia mass.

4. The acceleration sensor of claim 1, further comprising an electrical contacting area on said frame structure and a bearing device for supporting said sensor inertia mass, said bearing device forming an electrically conducting connection between said sensor inertia mass and said electrical contacting area on said frame structure.

5. The acceleration sensor of claim 1, further comprising a bearing device arranged on said sensor inertia mass close to a surface of said wafer.

6. The acceleration sensor of claim 1, wherein said center of gravity determining configuration of said second section of said sensor inertia mass has a shape selected from any one of the following shapes: a cubic shape, a parallelepiped, a frustum and a truncated pyramid.

7. The acceleration sensor of claim 1, comprising a plurality of sensor inertia masses movably mounted relative to a respective rotation axis ($A_X$, $A_Y$, $A_Z$) for measuring accelerations in a plurality of directions (x, y, z) extending perpendicularly to one another, wherein at least one of said plurality of sensor inertia masses has said center of gravity which is positioned offset relative to said respective rotation axis in a direction extending perpendicularly to a respective wafer plane defined by said at least one sensor inertia mass, wherein said rotation axis extends in said respective wafer plane.

8. The acceleration sensor of claim 1, wherein said capacitive pick-up unit comprises first capacitor electrodes provided on said first section of said sensor inertia mass and second capacitor electrodes provided on said frame structure opposite said first capacitor electrodes, said pick-up unit further comprising first connector elements for electrically connecting said first capacitor electrodes, and second connector elements for electrically connecting said second capacitor electrodes, said first and second connector elements being arranged in a common connector plane.

9. The acceleration sensor of claim 8, wherein at least one connector element of said first and second connector elements is contacted on a single side.

10. The acceleration sensor of claim 1, wherein said at least one capacitive pick-up unit is contacted electrically on a single side.

11. The acceleration sensor of claim 8, wherein said second capacitor electrodes on said frame structure and said first and second connector elements are supported by said common connector plane.

12. The acceleration sensor of claim 1, further comprising a coupling arrangement for coupling of first capacitor electrodes provided on said sensor inertia mass to first connector elements provided on said frame structure, said coupling arrangement comprising any one of a galvanic connection and a capacitive connection for bridging an elevational difference between said first capacitor electrodes and a common connector plane.

13. The acceleration sensor of claim 1, wherein said frame structure comprises a central frame section laterally enclosing said sensor inertia mass and a first cover section elevationally displaced relative to said sensor inertia mass, said first cover section being arranged on said central frame section, and wherein capacitor electrodes are provided on a facing side of said cover section, said facing side of said cover section facing said sensor inertia mass.

14. The acceleration sensor of claim 13, wherein said facing side of said first cover section facing said sensor inertia mass forms a common connector plane for an electrical connection of said capacitive pick-up unit.

15. The acceleration sensor of claim 8, wherein said first capacitor electrodes are formed by any one of a metallizing layer on said sensor inertia mass and by said sensor inertia mass made of an electrically conducting material.

16. A micromechanical capacitive acceleration sensor for picking up an acceleration of an object in at least one direction (x, y, z), said capacitive acceleration sensor comprising a frame structure which is stationary relative to said object, a sensor inertia mass defining an inertia mass plane, a bearing device elastically supporting said sensor inertia mass for movement relative to said frame structure and for movement relative to a starting position of said sensor inertia mass, said sensor inertia mass having a center of gravity positioned outside said bearing device and outside said inertia mass plane in a direction perpendicularly to said inertia mass plane, said capacitive acceleration sensor further comprising a capacitive pick-up unit for producing at least one capacitive output signal representing a position of said sensor inertia mass relative to said frame structure, said capacitive pick-up unit comprising first capacitor electrodes provided on said sensor inertia mass and second capacitor electrodes provided on said frame structure opposite said first capacitor electrodes, and a coupling arrangement including first connector elements coupled to said first capacitor electrodes, said first connector elements being provided on said frame structure, and second connector elements coupled to said second capacitor electrodes.

17. The acceleration sensor of claim 16, wherein at least said first connector elements are arranged in a common connector plane which is elevationally displaced relative to said first capacitor electrodes provided on said sensor inertia mass, and wherein said coupling arrangement comprises means for bridging an elevational difference between said first capacitor electrodes and said common connector plane.

18. The acceleration sensor of claim 16, wherein at least said second connector elements are arranged in a common connector plane which is elevationally displaced relative to said second capacitor electrodes provided on said frame structure, and wherein said coupling arrangement comprises means for bridging an elevational difference between said second capacitor electrodes and said common connector plane.

19. The acceleration sensor of claim 16, wherein said second capacitor electrodes provided on said frame structure and said first and second connector elements are supported by a common connector plane, and wherein said coupling arrangement comprises means for bridging an elevational difference to said common connector plane.

20. The acceleration sensor of claim 16, wherein said coupling arrangement forms any one of a galvanic and a capacitive connection which bridges an elevational difference to a common connector plane.

21. The acceleration sensor of claim 16, wherein said frame structure comprises a central frame section laterally surrounding said sensor inertia mass and a first cover section elevationally displaced relative to said sensor inertia mass, said first cover section being arranged on said central frame section, wherein said, second capacitor electrodes are provided on that side of said first cover section which faces said sensor inertia mass, and wherein said first capacitor electrodes are provided on said sensor inertia mass opposite said second capacitor electrodes.

22. The acceleration sensor of claim 21, wherein said first connector elements and said second connector elements are arranged in a common connector plane, which is formed by that side of said first cover section which faces said sensor inertia mass, and wherein said second capacitor electrodes are also supported by said side of said first cover section facing said sensor inertia mass.

23. The acceleration sensor of claim 22, wherein said first connector elements, said second connector elements and said second capacitor electrodes which are connected to the second connector elements, are made of a single conductive layer formed on that side of said first cover section which faces said sensor inertia mass.

24. The acceleration sensor of claim 23, wherein said coupling arrangement comprises first and second coupling electrodes, said second coupling electrode being formed on that side of said first cover section which faces said sensor inertia mass, said first coupling electrode being provided on said sensor inertia mass opposite said second coupling electrode, whereby said first and second coupling electrodes form a capacitive connection of the coupling arrangement for coupling the first capacitor electrodes provided on the sensor inertia mass with a first connector element of said first connector elements provided on said frame structure.

25. The acceleration sensor of claim 24, wherein said second coupling electrode and said first connector element are provided in a common connector plane which is formed by that side of said first cover section which faces the sensor inertia mass.

26. The acceleration sensor of claim 25, wherein said second coupling electrode and said first connector element connected to said first coupling electrode, said second capacitor electrodes and said second connector elements connected with the second capacitor electrodes are made of a single conducting layer formed on that side of said first cover section which faces said sensor inertia mass.

27. The acceleration sensor of claim 21, further comprising a second cover section positioned elevationally displaced relative to said sensor inertia mass, said second cover section being positioned at said central frame section opposite said first cover section, said second cover section forming together with said central frame section and with said first cover section a hermetically sealed housing enclosing said sensor inertia mass, said first capacitor electrodes and said second capacitor electrodes.

28. The acceleration sensor of claim 16, wherein said bearing device comprises torsion elements through which said sensor inertia mass is mounted to said frame structure in a torsion elastic manner for motion relative to and about said starting position.

29. The acceleration sensor of claim 28, wherein said torsion elements forming said bearing device are positioned relative to a common rotation axis, said torsion elements being effective on opposite sides of said sensor inertia mass, whereby said sensor inertia mass is movable only in a single direction (x, y, z) relative to said frame structure.

30. The acceleration sensor of claim 28, wherein one side of said torsion elements is secured to said sensor inertia mass and, wherein another side of said tension elements is secured to a central section of said frame structure.

31. The acceleration sensor of claim 28, wherein said coupling arrangement is formed by a galvanic connection which includes said torsion elements.

32. The acceleration sensor of claim 16, wherein said bearing device comprises at least one bending element by which said sensor inertia mass is supported in a bending elastic manner for motion around said starting position and relative to said frame structure.

33. The acceleration sensor of claim 32, wherein two bending elements are provided in a common plane spaced from each other and rigidly connected to said sensor inertia mass, whereby said sensor inertia mass is movable only in a single direction (x) relative to said frame structure.

34. The acceleration sensor of claim 32, wherein two bending elements are rigidly connected to said inertia mass and to said first cover section of said frame structure.

35. The acceleration sensor of claim 32, wherein said coupling arrangement is formed by a galvanic connection which includes said at least one bending element.

36. The acceleration sensor of claim 32, wherein said at least one bending element is centrally and rigidly connected to said sensor inertia mass, whereby said sensor inertia mass is movable with respect to two different directions (x, y) relative to said frame structure, and wherein said pick-up unit is adapted for producing two capacitive output signals which represent the position of said sensor inertia mass relative to said frame structure.

37. The acceleration sensor of claim 36, wherein said pick-up unit comprises four first capacitor electrodes secured to said sensor inertia mass in pairs positioned opposite each other and on opposite aides of said bending element, and four second capacitor electrodes secured to said first cover section of said frame structure, said second capacitor electrodes being arranged in pairs positioned opposite each other on opposite sides of said bending element and opposite said first capacitor electrodes.

38. The acceleration sensor of claim 36, wherein said coupling arrangement comprises a first coupling electrode provided on said sensor inertia mass and surrounding said bending element, and a second coupling electrode provided on said first cover section of said frame structure, and wherein said second coupling electrode is positioned opposite said first coupling electrode and surrounding said bending element.

39. The acceleration sensor of claim 36, wherein said coupling arrangement comprises a galvanic connection including said at least one bending element.

40. The acceleration sensor of claim 1, comprising a plurality of sensor inertia masses and wherein each sensor inertia mass comprises a respective capacitive pick-up unit for picking up an acceleration of an object in a plurality of directions (x, y, z), said acceleration sensor further comprising a plurality of bearing devices, each of said plurality of sensor inertia masses being supported by a respective bearing device in said frame structure independently of one another, each sensor inertia mass comprising a respective capacitive pick-up unit for producing an output signal representing the position of the respective sensor inertia mass relative to said frame structure.

41. The acceleration sensor of claim 40, wherein said sensor inertia masses are mounted in a common plane in said frame structure, and wherein first and second connector elements of all sensor inertia masses are provided in a common connector plane.

42. The acceleration sensor of claim 16, wherein said sensor inertia mass is adapted for picking-up an acceleration of said object in a horizontal direction (x, y), and wherein said bearing device of said sensor inertia mass is elevationally displaced upwardly relative to said center of gravity, whereby said sensor inertia mass performs, in response to an acceleration of said object, a rotational motion about a rotation axis defined by said bearing device.

43. The acceleration sensor of claim 16, wherein said sensor inertia mass is adapted for picking-up an acceleration of said object in a vertical direction (z), and wherein said bearing device of said sensor inertia mass is laterally offset relative to said center of gravity whereby said sensor inertia mass performs, in response to an acceleration of said object, a rotational motion about a rotation axis defined by said bearing device.

44. The acceleration sensor of claim 16, wherein said first capacitor electrodes are provided in pairs on said sensor inertia mass and respectively on opposite sides of a rotation axis ($A_X$, $A_Y$, $A_Z$) defined by said bearing device, wherein said second capacitor electrodes are provided in pairs on said frame structure and respectively positioned opposite said first capacitor electrodes, and wherein a differential capacity of said first and second capacitor electrodes forming pairs is used for producing a capacitive output signal of said pick-up unit.

45. The acceleration sensor of claim 16, wherein said first capacitor electrodes provided on said sensor inertia mass are formed of a conducting material of which the sensor inertia mass is made.

46. The acceleration sensor of claim 21, wherein said first cover section of said frame structure is made of a glass containing an alkali metal.

47. The acceleration sensor of claim 27, wherein said second cover section of said frame structure is made of a glass containing an alkali metal.

48. A method for producing an acceleration sensor as defined in claim 40, said method comprising the following steps:
a) first producing each of said plurality of sensor inertia masses as a single sensor, each single sensor having a respective frame structure, and
b) assembling said single sensors to a complete sensor.

* * * * *

UNITED STATES PATENT AND TRADEMARK OFFICE
CERTIFICATE OF CORRECTION

PATENT NO. : 7,343,801 B2
APPLICATION NO. : 10/471296
DATED : March 18, 2008
INVENTOR(S) : Kapser et al.

It is certified that error appears in the above-identified patent and that said Letters Patent is hereby corrected as shown below:

Title page,
Item [86], Line 3, (2), (4) Date: replace "May 21, 2005" by --May 2, 2005--;

Column 4,
Line 25, after "common", replace "connector-plane" by --connector plane--;

Column 17,
Line 52, after "on opposite", replace "aides" by --sides--.

Signed and Sealed this

Twenty-first Day of July, 2009

JOHN DOLL
*Acting Director of the United States Patent and Trademark Office*